(12) United States Patent
Ichinokiyama et al.

(10) Patent No.: US 11,471,841 B2
(45) Date of Patent: Oct. 18, 2022

(54) HYDROGEN GAS MIXING DEVICE

(71) Applicant: YAMAHA FINE TECHNOLOGIES CO., LTD., Hamamatsu (JP)

(72) Inventors: Hisashi Ichinokiyama, Hamamatsu (JP); Takeshi Katoh, Shimada (JP); Toru Ishii, Hamamatsu (JP); Yukio Sasaki, Iwata (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 0 days.

(21) Appl. No.: 17/135,211

(22) Filed: Dec. 28, 2020

(65) Prior Publication Data

US 2021/0213398 A1 Jul. 15, 2021

(30) Foreign Application Priority Data

Jan. 9, 2020 (JP) .............................. JP2020-002341

(51) Int. Cl.
| | |
|---|---|
| *B01F 23/10* | (2022.01) |
| *C25B 1/04* | (2021.01) |
| *B01F 35/83* | (2022.01) |

(52) U.S. Cl.
CPC ............ *B01F 23/19* (2022.01); *B01F 35/833* (2022.01); *C25B 1/04* (2013.01)

(58) Field of Classification Search
CPC ............... C25B 1/04; C25B 15/00–087; B01F 23/19–191
See application file for complete search history.

(56) References Cited

U.S. PATENT DOCUMENTS

| | | | |
|---|---|---|---|
| 5,457,963 A | 10/1995 | Cahill-O'Brien et al. | |
| 2010/0206740 A1* | 8/2010 | Takeuchi | ................. C25B 1/04 |
| | | | 205/338 |
| 2017/0175277 A1 | 6/2017 | von Olshausen et al. | |
| 2018/0202053 A1* | 7/2018 | Harano | ................... C25B 15/02 |
| 2019/0232235 A1 | 8/2019 | Takahashi | |

(Continued)

FOREIGN PATENT DOCUMENTS

| | | |
|---|---|---|
| CN | 201524879 U | 7/2010 |
| JP | 2009228044 A | 10/2009 |
| JP | 2012087396 A | 5/2012 |

(Continued)

OTHER PUBLICATIONS

Depending U.S. Appl. No. 17/135,093, filed Dec. 28, 2020.
(Continued)

*Primary Examiner* — Nicholas A Smith
(74) *Attorney, Agent, or Firm* — Rossi, Kimms & McDowell LLP (57) ABSTRACT

There is provided a hydrogen gas mixing device that includes a hydrogen generation part configured to generate a hydrogen gas; a mixing gas supply part configured to supply a mixing gas; a gas mixing part configured to mix the hydrogen gas and the mixing gas; a dilution gas supply part configured to supply a non-combustible dilution gas; and a valve circuit configured to, at an abnormality occurrence time, dilute the hydrogen gas with the dilution gas by connecting a first path for the hydrogen gas supplied from the hydrogen generation part and a second path for the dilution gas supplied from the dilution gas supply part.

6 Claims, 2 Drawing Sheets

(56) References Cited

U.S. PATENT DOCUMENTS

2019/0282951 A1  9/2019  Rheaume et al.
2021/0355590 A1  11/2021  Homma et al.

FOREIGN PATENT DOCUMENTS

| JP | 2018140361 A | 9/2018 | | |
|---|---|---|---|---|
| JP | 2018162484 A | 10/2018 | | |
| WO | WO-2018074460 A1 | * | 4/2018 | .......... B01F 11/0077 |

OTHER PUBLICATIONS

Office Action issued in U.S. Appl. No. 17/135,093 dated Mar. 3, 2022.
Office Action issued in Korean Appln. No. 10-2020-0177345 dated Apr. 20, 2022. English translation provided.
Office Action issued in U.S. Appl. No. 17/135,093 dated Jul. 15, 2022.
Office Action issued in Chinese Appln. No. 202011525170.3 dated Jul. 1, 2022. English machine translation provided.
Office Action issued in Chinese Appln. No. 202011525172.2 dated Jul. 5, 2022. English machine translation provided.

* cited by examiner

HYDROGEN GAS MIXING DEVICE

CROSS-REFERENCE TO RELATED APPLICATION(S)

This application is based upon and claims the benefit of priority from Japanese Patent Application No. 2020-002341, filed on Jan. 9, 2020, the entire contents of which are incorporated herein by reference.

TECHNICAL FIELD

The present disclosure relates to a hydrogen gas mixing device.

BACKGROUND

Patent Document 1 discloses a hydrogen gas mixing device that mixes and supplies a hydrogen gas and a mixing gas (nitrogen gas). The hydrogen gas mixing device of Patent Document 1 includes a hydrogen generation part that generates a hydrogen gas, a mixing gas supply part that supplies a mixing gas, and a gas mixing part that mixes the hydrogen gas and the mixing gas.

PRIOR ART DOCUMENTS

Patent Documents

Patent Document 1: Japanese Patent Application Publication No. 2018-140361

In this type of hydrogen gas mixing device, a high-concentration hydrogen gas is generated in the hydrogen generation part. For this reason, it is necessary to treat the hydrogen gas existing in the hydrogen generation part when an abnormality occurs (e.g., when power failure occurs).

SUMMARY

The present disclosure provides a hydrogen gas mixing device capable of treating a hydrogen gas even when an abnormality occurs.

According to an embodiment of the present disclosure, a hydrogen gas mixing device includes: a hydrogen generation part configured to generate a hydrogen gas; a mixing gas supply part configured to supply a mixing gas; a gas mixing part configured to mix the hydrogen gas and the mixing gas; a dilution gas supply part configured to supply a non-combustible dilution gas; and a valve circuit configured to, at an abnormality occurrence time, dilute the hydrogen gas with the dilution gas by connecting a first path for the hydrogen gas supplied from the hydrogen generation part and a second path for the dilution gas supplied from the dilution gas supply part.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

An embodiment of the present disclosure will be described below with reference to FIGS. 1 and 2. The gas mixing device (hydrogen gas mixing device) 1 of the present embodiment shown in FIG. 1 mixes a combustible gas and a non-combustible gas, and supplies the mixed gas to various devices such as a leak inspection device and the like. The mixed gas is used as, for example, an inspection gas in a leak inspection (leak test).

The gas mixing device 1 includes a hydrogen generation part (combustible gas generation part) 2, a mixing gas supply part 3, and a gas mixing part 4. Further, the gas mixing device 1 includes a dilution gas supply part 5 and a valve circuit 6. In addition, the gas mixing device 1 includes an electric device 7 and a housing 8.

The hydrogen generation part 2 generates a hydrogen gas, which is a combustible gas. As shown in FIG. 2, the hydrogen generation part 2 of the present embodiment is a water electrolysis part that generates a hydrogen gas and an oxygen gas by electrolyzing water (water electrolysis). The hydrogen generation part 2 includes a solid polymer electrolyte membrane 201, an anode-side electrode catalyst layer 202, a cathode-side electrode catalyst layer 203, an anode-side power supply body 204, a gas-liquid separator 205, a water circulation pump 206, an oxygen path 207, a cathode-side power supply body 208, and a hydrogen path 209.

The solid polymer electrolyte membrane 201 is an ion filtration membrane that allows only cations (here, hydrogen ions) to pass therethrough. The anode-side electrode catalyst layer 202 is provided on one side (anode side) of the solid polymer electrolyte membrane 201. The cathode-side electrode catalyst layer 203 is provided on the other side (cathode side) of the solid polymer electrolyte membrane 201. The anode-side electrode catalyst layer 202 and the cathode-side electrode catalyst layer 203 are electrically connected via a power source.

The anode-side power supply body 204 is provided to sandwich the anode-side electrode catalyst layer 202 between the anode-side power supply body 204 and the solid polymer electrolyte membrane 201. The gas-liquid separator 205 is arranged above the anode-side power supply body 204 and is connected to the anode-side power supply body 204 via two pipes 211 and 212. The gas-liquid separator 205 is a water tank to which a plurality of pipes is connected. The first pipe 211 connects an upper portion of the anode-side power supply body 204 and a lower portion of the gas-liquid separator 205. The second pipe 212 connects the lower portion of the gas-liquid separator 205 and a lower portion of the anode-side power supply body 204. The water circulation pump 206 is provided in the middle of the second pipe 212.

Water flows through the anode-side power supply body 204, the lower portion of the gas-liquid separator 205, the first pipe 211, and the second pipe 212. The water circulation pump 206 causes the water to sequentially flow to the anode-side power supply body 204, the first pipe 211, the lower portion of the gas-liquid separator 205, and the second pipe 212. That is, the water circulates between the anode-side power supply body 204 and the gas-liquid separator 205. The oxygen path 207 is a pipe connected to an upper portion of the gas-liquid separator 205. The oxygen path 207 is opened to the atmosphere or connected to an exhaust pipe (not shown) of a factory through which another exhaust gas flows. An oxygen gas generated in the anode-side power supply body 204 flows through the oxygen path 207.

The cathode-side power supply body 208 is provided to sandwich the cathode-side electrode catalyst layer 203 between the cathode-side power supply body 208 and the solid polymer electrolyte membrane 201. The hydrogen path 209 is a pipe connected to an upper portion of the cathode-side power supply body 208. The hydrogen path 209 is connected to a first mixing path 11 (see FIG. 1) described later. The hydrogen gas generated in the cathode-side power supply body 208 flows through the hydrogen path 209.

In the hydrogen generation part 2, water in the anode-side power supply body 204 is electrolyzed in a state in which a voltage is applied from the anode-side to the cathode-side of the solid polymer electrolyte membrane 201 by the power source. The anode-side electrode catalyst layer 202 and the cathode-side electrode catalyst layer 203 promote the electrolysis. By virtue of the electrolysis of water, hydrogen ions are generated in the anode-side power supply body 204. The hydrogen ions pass through the solid polymer electrolyte membrane 201 and move to the cathode-side power supply body 208. The hydrogen ions that have moved to the cathode-side power supply body 208 are combined with electrons to become a hydrogen gas. The hydrogen gas generated in the cathode-side power supply body 208 has a high concentration and flows out to the first mixing path 11 (see FIG. 1) through the hydrogen path 209.

On the other hand, in the anode-side power supply body 204, a high-concentration oxygen gas is generated by the electrolysis of water. The oxygen gas generated in the anode-side power supply body 204 passes through the first pipe 211. The oxygen gas is separated from water in the gas-liquid separator 205, and is released to the outside (the atmosphere or the exhaust pipe of a factory) through the oxygen path 207. A part of the oxygen gas generated in the anode-side power supply body 204 may circulate through the second pipe 212 due to the operation of the water circulation pump 206 without being separated from water in the gas-liquid separator 205. That is, the anode-side power supply body 204, the gas-liquid separator 205, and the first and second pipes 211 and 212 constitute an oxygen flow part 20 in which the oxygen gas circulates.

Figure 1:
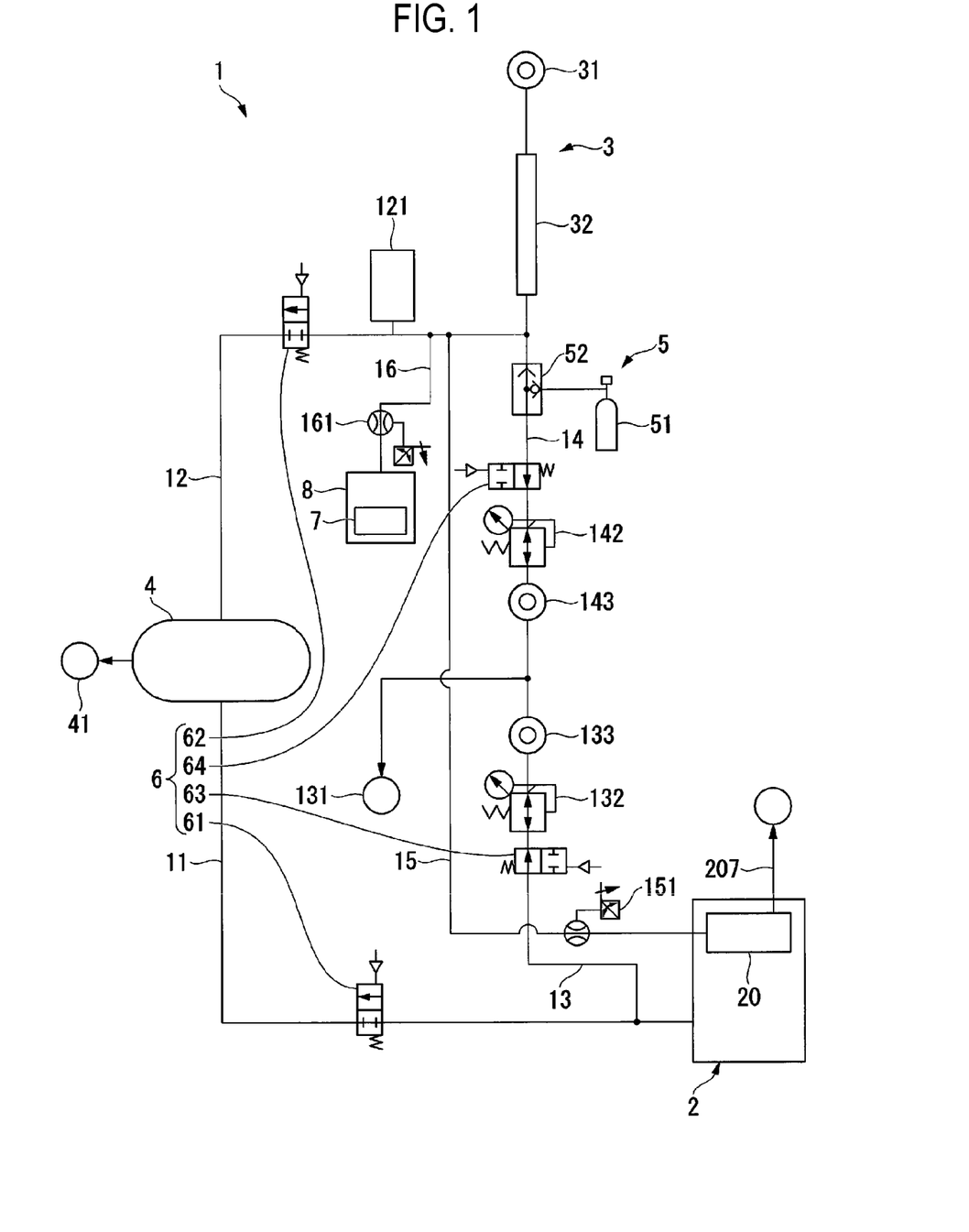
FIG. 1 is a block diagram showing a gas mixing device according to an embodiment of the present disclosure.
Figure 2:
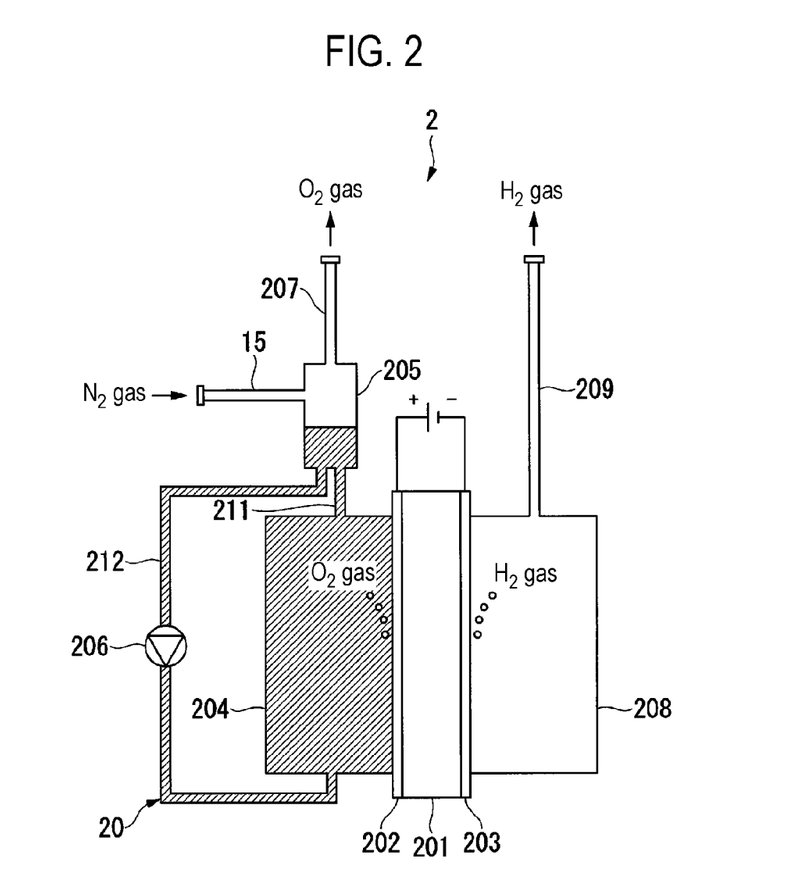
FIG. 2 is a diagram showing a hydrogen generation part of the gas mixing device shown in FIG. 1.

The mixing gas supply part 3 shown in FIG. 1 supplies a mixing gas as a non-combustible gas to be mixed with the aforementioned hydrogen gas. The mixing gas used in the present embodiment is a nitrogen gas. The mixing gas may also be, for example, a helium gas, an argon gas, a carbon dioxide gas, or the like.

The mixing gas supply part 3 includes an air supply source 31 and a filter 32. The air supply source 31 is connected to the filter 32 to supply air to the filter 32. The air supply source 31 may be an air pipe through which air flows, a fan or a blower that causes air to flow toward the filter 32, or the like. The filter 32 is, for example, a membrane module (membrane-separation nitrogen gas generator). The filter 32 separates a nitrogen gas from the introduced air and takes out the separated nitrogen gas. That is, the filter 32 functions as a mixing gas generation part that generates a nitrogen gas having a relatively high concentration. The nitrogen gas generated by the filter 32 flows out to a second mixing path 12 described later.

The gas mixing part 4 mixes the hydrogen gas supplied from the hydrogen generation part 2 and the nitrogen gas supplied from the mixing gas supply part 3. Specifically, the gas mixing part 4 is connected to the hydrogen generation part 2 via the first mixing path 11. Further, the gas mixing part 4 is connected to the mixing gas supply part 3 (particularly the filter 32) via the second mixing path 12. As a result, the high-concentration hydrogen gas is guided from the hydrogen generation part 2 to the gas mixing part 4 through the first mixing path 11. Moreover, the high-concentration nitrogen gas is guided from the mixing gas supply part 3 to the gas mixing part 4 through the second mixing path 12. The mixed gas obtained by mixing the hydrogen gas and the nitrogen gas in the gas mixing part 4 may be supplied from a supply port 41 to various devices such as a leak inspection device and the like.

An exhaust path (first path) 13 is connected to an intermediate portion of the first mixing path 11 extending from the hydrogen generation part 2 to the gas mixing part 4. An exhaust port 131 is provided at a front end of the exhaust path 13 in the extension direction. The exhaust port 131 is opened to the atmosphere or is connected to an exhaust pipe (not shown) of a factory. As a result, the hydrogen gas supplied from the hydrogen generation part 2 can be released to the outside of the gas mixing device 1 (the atmosphere or the exhaust pipe of the factory) through the exhaust path 13.

The dilution gas supply part 5 supplies a non-combustible dilution gas. The dilution gas is used to dilute the hydrogen gas released from the hydrogen generation part 2 to the outside through the exhaust path 13. Specifically, a dilution gas path (second path) 14 extending from the dilution gas supply part 5 is connected to the intermediate portion of the exhaust path 13 in the extension direction. Thus, the dilution gas is introduced into the exhaust path 13 through the dilution gas path 14, whereby the hydrogen gas flowing through the exhaust path 13 can be diluted with the dilution gas and released to the outside. In the present embodiment, a nitrogen gas is used as the dilution gas. As the dilution gas, for example, a helium gas, an argon gas, a carbon dioxide gas, or the like may also be used.

The dilution gas supply part 5 includes a pressure container 51 that stores a nitrogen gas (dilution gas) in a compressed state. The pressure container 51 may be a cylinder or a tank. The dilution gas supply part 5 also includes the mixing gas supply part 3 described above. Therefore, the dilution gas path 14 is branched at an intermediate portion thereof and connected to both the pressure container 51 and the mixing gas supply part 3. The dilution gas path 14 is connected to the mixing gas supply part 3 via the second mixing path 12. The dilution gas path 14 may be directly connected to, for example, the mixing gas supply part 3. A shuttle valve (switching part) 52 is provided at the branch portion of the dilution gas path 14. The shuttle valve 52 switches between the nitrogen gas supplied from the mixing gas supply part 3 and the nitrogen gas stored in the pressure container 51 as the dilution gas for diluting the hydrogen gas. Specifically, the shuttle valve 52 causes either the nitrogen gas supplied from the pressure container 51 or the nitrogen gas supplied from the mixing gas supply part 3, whichever has a higher pressure, to flow toward the exhaust path 13.

A regulator 132 and an orifice 133 are provided in a portion of the exhaust path 13 on an upstream side (on the side of the first mixing path 11) of a portion where the exhaust path 13 joins the dilution gas path 14. The regulator 132 and the orifice 133 adjust a flow rate of hydrogen gas flowing through the exhaust path 13. Similarly, a regulator 142 and an orifice 143 for adjusting a flow rate of the nitrogen gas flowing through the dilution gas path 14 are provided in the dilution gas path 14. This makes it possible to adjust a mixing ratio of the nitrogen gas and the hydrogen gas released to the outside, i.e., a concentration of the hydrogen gas diluted with the nitrogen gas. The regulators 132 and 142 and the orifices 133 and 143 can adjust the flow rates of the hydrogen gas and the nitrogen gas without power such as electric power or the like. The orifices 133 and 143 may be, for example, flow rate adjustment valves (speed controllers).

At the normal time when no abnormality occurs in the gas mixing device 1, the valve circuit 6 guides the hydrogen gas from the hydrogen generation part 2 to the gas mixing part 4 through the first mixing path 11 and guides the nitrogen gas from the mixing gas supply part 3 to the gas mixing part 4 through the second mixing path 12. Specifically, the valve circuit 6 includes a first normally-closed electromagnetic valve 61 that opens and closes the first mixing path 11, and a second normally-closed electromagnetic valve 62 that opens and closes the second mixing path 12. The first and second normally-closed electromagnetic valves 61 and 62 open the first and second mixing paths 11 and 12 at the time of supplying electric power at which electric power is supplied to them, and close the first and second mixing paths 11 and 12 at the time of not supplying electric power at which electric power is not supplied to them. That is, in the gas mixing device 1, the hydrogen gas and the nitrogen gas are supplied to the gas mixing part 4 only at the time of supplying electric power, and are not supplied to the gas mixing part 4 at the time of not supplying electric power.

In addition, at the time when an abnormality occurs in the gas mixing device 1 (at the abnormality occurrence time) such as during a power failure or the like, the valve circuit 6 connects the exhaust path (first path) 13 for the hydrogen gas supplied from the hydrogen generation part 2 and the dilution gas path (second path) 14 for the nitrogen gas (dilution gas) supplied from the dilution gas supply part 5, thereby diluting the hydrogen gas with the nitrogen gas. Specifically, the valve circuit 6 includes a first normally-open electromagnetic valve 63 that opens and closes the exhaust path 13, and a second normally-open electromagnetic valve 64 that opens and closes the dilution gas path 14. The first and second normally-open electromagnetic valves 63 and 64 open the exhaust path 13 and the dilution gas path 14 at the time of not supplying electric power at which electric power is not supplied to them, and closes the exhaust path 13 and the dilution gas path 14 at the time of supplying electric power at which electric power is supplied to them. That is, in the gas mixing device 1, the hydrogen gas diluted with the nitrogen gas is released to the outside only at the time of not supplying electric power, and is not released to the outside at the time of supplying electric power. The control of the power supply to the first and second normally-closed electromagnetic valves 61 and 62 and the first and second normally-open electromagnetic valves 63 and 64 described above is performed by, for example, an electric device 7 described later.

In the gas mixing device 1, the non-combustible dilution gas is introduced into the oxygen flow part 20 of the hydrogen generation part 2 through which the oxygen gas flows. In the present embodiment, the dilution gas introduced into the oxygen flow part 20 is the nitrogen gas (mixing gas) supplied from the mixing gas supply part 3. The dilution gas introduced into the oxygen flow part 20 may also be, for example, the nitrogen gas supplied from the pressure container 51.

The oxygen flow part 20 of the hydrogen generation part 2 is connected to the mixing gas supply part 3 via a first introduction path 15. Specifically, the first introduction path 15 is connected to the mixing gas supply part 3 by being connected to the second mixing path 12 on an upstream side of the second normally-closed electromagnetic valve 62. The first introduction path 15 may be directly connected to, for example, the mixing gas supply part 3. Further, as shown in FIG. 2, the first introduction path 15 is connected to the gas-liquid separator 205 of the oxygen flow part 20. Specifically, the first introduction path 15 is connected to a portion of the gas-liquid separator 205 located above the water surface. The first introduction path 15 may be connected to, for example, a portion of the oxygen flow part 20 located below the water surface (the anode-side power supply body 204, the lower portion of the gas-liquid separator 205, or the first and second pipes 211 and 212). As shown in FIG. 1, a first flow meter 151 for measuring a flow rate of the nitrogen gas (dilution gas) introduced into the oxygen flow part 20 is provided in the first introduction path 15.

The electric device 7 is a device (e.g., a control panel) that supplies electric power to the respective parts of the gas mixing device 1 (e.g., the hydrogen generation part 2 and the valve circuit 6) and performs electric control. The electric device 7 includes components such as a relay contact, a button, a breaker, and the like in which electric discharge may occur, and components which may be charged. The housing 8 accommodates the electric device 7 described above. A non-combustible gas is introduced into the housing 8. In the present embodiment, the non-combustible gas introduced into the housing 8 is the nitrogen gas (mixing gas) supplied from the mixing gas supply part 3. The non-combustible gas introduced into the housing 8 may also be, for example, the nitrogen gas supplied from the pressure container 51.

The housing 8 is connected to the mixing gas supply part 3 via a second introduction path 16. Specifically, the pipe that constitutes the second introduction path 16 is connected to the internal space of the housing 8 via a hole formed in the housing 8, whereby the inside of the housing 8 is connected to the mixing gas supply part 3. Thus, the nitrogen gas supplied from the mixing gas supply part 3 can be introduced into the housing 8. Furthermore, the second introduction path 16 is connected to the mixing gas supply part 3 by being connected to the second mixing path 12 on the upstream side of the second normally-closed electromagnetic valve 62. The second introduction path 16 may be directly connected to, for example, the mixing gas supply part 3. The housing 8 is not completely sealed from the outside. Therefore, the nitrogen gas supplied from the mixing gas supply part 3 is continuously introduced into the housing 8. The housing 8 may be completely sealed, for example, from the outside. A second flow meter 161 for measuring a flow rate of the nitrogen gas (dilution gas) introduced into the housing 8 is provided in the second introduction path 16. Instead of the second flow meter 161, a pressure gauge for measuring the pressure (atmospheric pressure) in the second introduction path 16 may be provided in the second introduction path 16.

In the gas mixing device 1 of the present embodiment, the generation of the hydrogen gas and the oxygen gas in the hydrogen generation part 2 is stopped depending on a concentration of the oxygen gas contained in the nitrogen gas (the dilution gas or the non-combustible gas) introduced into the oxygen flow part 20 of the hydrogen generation part 2 or the housing 8. This control is performed by, for example, the electric device 7 (control panel) arranged in the housing 8. Specifically, an oxygen concentration meter 121 provided in the second mixing path 12 measures the concentration of the oxygen gas contained in the nitrogen gas supplied from the mixing gas supply part 3. Then, the electric device 7 controls the generation of the hydrogen gas in the hydrogen generation part 2 based on the measurement result outputted from the oxygen concentration meter 121. That is, when the oxygen gas concentration measured by the oxygen concentration meter 121 becomes equal to or larger than a predetermined value, the electric device 7 stops the generation of the hydrogen gas in the hydrogen generation part 2. The oxygen concentration meter 121 described above may be provided in, for example, the first introduction path 15 or the second introduction path 16.

In the gas mixing device 1 of the present embodiment, the generation of the hydrogen gas and the oxygen gas in the hydrogen generation part 2 is stopped depending on the flow rate of the nitrogen gas (dilution gas) introduced into the oxygen flow part 20 and the housing 8. This control is performed by, for example, the electric device 7 (control panel) arranged in the housing 8. Specifically, the first flow meter 151 measures the flow rate of the nitrogen gas (dilution gas) introduced into the oxygen flow part 20 through the first introduction path 15. Furthermore, the second flow meter 161 measures the flow rate of the nitrogen gas (non-combustible gas) introduced into the housing 8 through the second introduction path 16. Then, the electric device 7 controls the generation of the hydrogen gas in the hydrogen generation part 2 based on the measurement results outputted from the first flow meter 151 and the second flow meter 161. That is, when the flow rate of the nitrogen gas measured by the first flow meter 151 or the second flow meter 161 becomes equal to or smaller than a predetermined value, the electric device 7 stops the generation of the hydrogen gas in the hydrogen generation part 2.

Next, the operation of the gas mixing device 1 of the present embodiment will be described. First, the operation at the normal time at which no abnormality occurs in the gas mixing device 1 will be described. During the normal time, electric power is supplied to the hydrogen generation part 2, thereby generating a hydrogen gas and an oxygen gas in the hydrogen generation part 2. In addition, a nitrogen gas is generated in the mixing gas supply part 3. Furthermore, during the normal time, electric power is supplied to the first and second normally-closed electromagnetic valves 61 and 62 and the first and second normally-open electromagnetic valves 63 and 64. As a result, the first and second normally-closed electromagnetic valves 61 and 62 open the first and second mixing paths 11 and 12, respectively. Moreover, the first and second normally-open electromagnetic valves 63 and 64 close the exhaust path 13 and the dilution gas path 14, respectively. Therefore, the hydrogen gas supplied from the hydrogen generation part 2 and the nitrogen gas supplied from the mixing gas supply part 3 are guided into the gas mixing part 4 and mixed by the gas mixing part 4.

Furthermore, during the normal time, the nitrogen gas supplied from the mixing gas supply part 3 is also introduced into the oxygen flow part 20 of the hydrogen generation part 2. As a result, the oxygen gas flowing through the oxygen flow part 20 is diluted with the nitrogen gas and then released to the outside of the hydrogen generation part 2. That is, the oxygen gas can be released to the outside of the hydrogen generation part 2 at a low concentration.

Moreover, during the normal time, the nitrogen gas supplied from the mixing gas supply part 3 is also introduced into the housing 8 that accommodates the electric device 7. As a result, the inside of the housing 8 can be filled with the nitrogen gas which is a non-combustible gas. This makes it possible to restrain the combustible gas such as the hydrogen gas or the like from affecting the electric device 7 arranged inside the housing 8.

Next, the operation when an abnormality occurs in the gas mixing device 1 (at the abnormality occurrence time) will be described by taking three examples. The first example of the abnormality occurrence time is the time at which the concentration of the oxygen gas contained in the nitrogen gas supplied from the mixing gas supply part 3 into the oxygen flow part 20 or the inside of the housing 8 becomes equal to or larger than a predetermined value. At this time, the electric device 7 stops the supply of electric power to the hydrogen generation part 2, thereby stopping the generation of the hydrogen gas and the oxygen gas in the hydrogen generation part 2. As a result, it is possible to restrain the oxygen gas, which is a combustion-assisting gas, from being released to the outside of the hydrogen generation part 2 at a high concentration. In addition, it is possible to restrain the concentration of the oxygen gas from rising excessively in the housing 8.

Furthermore, when the concentration of the oxygen gas contained in the nitrogen gas supplied from the mixing gas supply part 3 becomes equal to or larger than the predetermined value, the electric device 7 stops the supply of electric power to the valve circuit 6. Therefore, the first and second normally-closed electromagnetic valves 61 and 62 close the first and second mixing paths 11 and 12, respectively, and the first and second normally-open electromagnetic valves 63 and 64 open the exhaust path 13 and the dilution gas path 14, respectively. As a result, the hydrogen gas remaining in the hydrogen generation part 2 and passing through the exhaust path 13 is diluted with the nitrogen gas (dilution gas) passing through the dilution gas path 14 and flowing toward the exhaust path 13, and is then released to the outside through the exhaust port 131. At this time, the nitrogen gas flowing toward the exhaust path 13 through the dilution gas path 14 may be the nitrogen gas supplied from the mixing gas supply part 3 or the nitrogen gas supplied from the pressure container 51.

The second example of the abnormality occurrence time is the time at which the flow rate of the nitrogen gas supplied from the mixing gas supply part 3 into the oxygen flow part 20 and the inside of the housing 8 becomes equal to or smaller than a predetermined value. At this time, the electric device 7 stops the generation of the hydrogen gas and the oxygen gas in the hydrogen generation part 2. In addition, the electric device 7 stops the supply of electric power to the valve circuit 6 so that the first and second normally-closed electromagnetic valves 61 and 62 close the first and second mixing paths 11 and 12, respectively, and the first and second normally-open electromagnetic valves 63 and 64 open the exhaust path 13 and the dilution gas path 14, respectively. Thus, it is possible to prevent the oxygen gas flowing through the oxygen flow part 20 from being released to the outside of the hydrogen generation part 2 at a high concentration. Furthermore, the hydrogen gas remaining in the hydrogen generation part 2 and passing through the exhaust path 13 can be diluted with the nitrogen gas (dilution gas) passing through the dilution gas path 14 and flowing toward the exhaust path 13, and then can be released to the outside via the exhaust port 131. At this time, the nitrogen gas flowing toward the exhaust path 13 through the dilution gas path 14 may be the nitrogen gas supplied from the mixing gas supply part 3 or the nitrogen gas supplied from the pressure container 51.

The third example of the abnormality occurrence time is the time at which the supply of electric power to the gas mixing device 1 is stopped due to a power failure or the like (power failure time). At the power failure time, the supply of electric power to the hydrogen generation part 2 is stopped. Therefore, the generation of the hydrogen gas and the oxygen gas in the hydrogen generation part 2 is stopped. Furthermore, at the power failure time, the supply of electric power to the first and second normally-closed electromagnetic valves 61 and 62 and the first and second normally-open electromagnetic valves 63 and 64 is stopped. Therefore, the first and second normally-closed electromagnetic valves 61 and 62 close the first and second mixing paths 11 and 12, respectively, and the first and second normally-open electromagnetic valves 63 and 64 open the exhaust path 13 and the dilution gas path 14, respectively. As a result, the hydrogen gas remaining in the hydrogen generation part 2 and passing through the exhaust path 13 is diluted with the nitrogen gas (dilution gas) passing through the dilution gas path 14 and flowing toward the exhaust path 13, and then is released to the outside through the exhaust port 131.

At this time, the nitrogen gas passing through the dilution gas path 14 and flowing toward the exhaust path 13 may be the nitrogen gas supplied from the mixing gas supply part 3. However, when the supply of the nitrogen gas from the mixing gas supply part 3 is stopped due to the influence of a power failure or the like, the supply source of the nitrogen gas is switched from the mixing gas supply part 3 to the pressure container 51 by the function of the shuttle valve 52. That is, the nitrogen gas supplied from the pressure container 51 flows toward the exhaust path 13 through the dilution gas path 14 and dilutes the hydrogen gas passing through the exhaust path 13. In each of the above-mentioned first, second, and third examples, for example, the first and second normally-closed electromagnetic valves 61 and 62 may be omitted. That is, in each of the first, second, and third examples described above, the hydrogen gas passing through the exhaust path 13 may be diluted with the nitrogen gas passing through the dilution gas path 14 in a state in which the first and second mixing paths 11 and 12 are not closed.

As described above, the gas mixing device 1 according to the present embodiment includes the valve circuit 6 for diluting the hydrogen gas with the nitrogen gas at the abnormality occurrence time such as a power failure time or the like by connecting the exhaust path 13 for the hydrogen gas supplied from the hydrogen generation part 2 and the dilution gas path 14 for the nitrogen gas (dilution gas) supplied from the dilution gas supply part 5. Therefore, at the abnormality occurrence time, the high-concentration hydrogen gas in the hydrogen generation part 2 can be diluted into a low-concentration hydrogen gas. Accordingly, the hydrogen gas can be treated even at the abnormality occurrence time.

Furthermore, in the gas mixing device 1 of the present embodiment, the hydrogen gas existing in the hydrogen generation part 2 is diluted with the nitrogen gas supplied from the dilution gas supply part 5 and then released to the atmosphere. Accordingly, it is possible to prevent the high-concentration hydrogen gas existing in the hydrogen generation part 2 from being released to the atmosphere.

Furthermore, according to the gas mixing device 1 of the present embodiment, the valve circuit 6 includes the first normally-open electromagnetic valve 63 that opens and closes the exhaust path 13, and the second normally-open electromagnetic valve 64 that opens and closes the dilution gas path 14. The first and second normally-open electromagnetic valves 63 and 64 open the exhaust path 13 and the dilution gas path 14, respectively, in a state in which electric power is not supplied to them. Therefore, by stopping the supply of electric power to the first and second normally-open electromagnetic valves 63 and 64 at the abnormality occurrence time, it is possible to reliably connect the exhaust path 13 and the dilution gas path 14. Further, at the power failure time, the supply of electric power to the first and second normally-open electromagnetic valves 63 and 64 is automatically stopped. This makes it possible to automatically connect the exhaust path 13 and the dilution gas path 14. Accordingly, at the abnormality occurrence time, it is possible to reliably dilute the hydrogen gas with the nitrogen gas (dilution gas).

Furthermore, according to the gas mixing device 1 of the present embodiment, the dilution gas supply part 5 that supplies the nitrogen gas (non-combustible dilution gas) includes the mixing gas supply part 3. That is, the mixing gas supply part 3 also functions as the dilution gas supply part 5. Accordingly, as compared with the case where the dilution gas supply part 5 and the mixing gas supply part 3 are completely separated from each other, it is possible to reduce the area occupied by the gas mixing device 1 and the manufacturing cost.

Furthermore, in the gas mixing device 1 according to the present embodiment, the mixing gas supply part 3 that functions as the dilution gas supply part 5 includes the filter 32 that separates the nitrogen gas from the air and takes out the nitrogen gas. Accordingly, it becomes possible to cause the nitrogen gas as the dilution gas to continuously flow through the dilution gas path 14. That is, the hydrogen gas supplied from the hydrogen generation part 2 can be sufficiently diluted with the nitrogen gas.

Furthermore, in the gas mixing device 1 according to the present embodiment, the dilution gas supply part 5 that supplies the nitrogen gas (non-combustible dilution gas) includes the pressure container 51 that stores the nitrogen gas in a compressed state. Accordingly, even if there is no power such as electric power or the like, it is possible to allow the nitrogen gas to flow through the dilution gas path 14 under the pressure of the nitrogen gas itself. Therefore, at the abnormality occurrence time such as a power failure time or the like, the hydrogen gas supplied from the hydrogen generation part 2 can be reliably diluted with the nitrogen gas supplied from the pressure container 51. Further, the pressure container 51 that stores the nitrogen gas in a high pressure state is more compact than a container that stores a nitrogen gas at the atmospheric pressure. Accordingly, the gas mixing device 1 can be made compact.

Furthermore, in the gas mixing device 1 according to the present embodiment, the non-combustible nitrogen gas (dilution gas) is introduced into the oxygen flow part 20 of the hydrogen generation part 2. Thus, the oxygen gas flowing through the oxygen flow part 20 can be diluted with the non-combustible nitrogen gas and then released to the outside (e.g., the atmosphere). That is, the oxygen gas generated in the hydrogen generation part 2 can be treated and then released to the outside. Further, even if the solid polymer electrolyte membrane is broken and the hydrogen gas enters the oxygen flow part 20, the oxygen gas is diluted with the nitrogen gas, it is possible to reduce the concentration of the mixed gas obtained by mixing the hydrogen gas, which is a combustible gas, and the oxygen gas, which is a combustion-assisting gas.

Furthermore, in the gas mixing device 1 according to the present embodiment, when the concentration of the oxygen gas contained in the nitrogen gas (dilution gas) introduced into the oxygen flow part 20 becomes equal to or larger than a predetermined value, the hydrogen generation part 2 stops the generation of the hydrogen gas and the oxygen gas. Moreover, in the gas mixing device 1 according to the present embodiment, the generation of the hydrogen gas and the oxygen gas in the hydrogen generation part 2 is stopped even when the flow rate of the nitrogen gas introduced into the oxygen flow part 20 becomes equal to or smaller than the predetermined value. As a result, it is possible to prevent the concentration of the oxygen gas released from the hydrogen generation part 2 to the outside from increasing.

Furthermore, in the gas mixing device 1 according to the present embodiment, the nitrogen gas (dilution gas) introduced into the oxygen flow part 20 is supplied from the mixing gas supply part 3. Therefore, as compared with the case where a supply source for a nitrogen gas to be introduced into the oxygen flow part 20 is separately prepared, it is possible to reduce the area occupied by the gas mixing device 1 and the manufacturing cost.

Furthermore, in the gas mixing device 1 according to the present embodiment, the non-combustible nitrogen gas (non-combustible gas) is introduced into the housing 8 that accommodates the electric device 7. As a result, it is possible to prevent the hydrogen gas (combustible gas) generated in the hydrogen generation part 2 from entering the inside of the housing 8. Accordingly, it is possible to restrain the hydrogen gas from affecting the electric devices 7 arranged in the housing 8. As the nitrogen gas (non-combustible gas) introduced into the housing 8, a gas used for mixing with the hydrogen gas (combustible gas) is used. Therefore, as compared with the case where a supply source for the non-combustible gas to be introduced into the housing 8 is separately prepared, it is possible to reduce the area occupied by the gas mixing device 1 and the manufacturing cost.

Furthermore, in the gas mixing device 1 according to the present embodiment, when the concentration of the oxygen gas contained in the nitrogen gas (non-combustible gas) introduced into the housing 8 becomes equal to or larger than a predetermined value, the generation of the hydrogen gas in the hydrogen generation part 2 is stopped. As a result, it is possible to restrain the oxygen gas contained in the nitrogen gas introduced into the housing 8 from affecting the electric device 7 arranged inside the housing 8.

Furthermore, in the gas mixing device 1 according to the present embodiment, even when the flow rate of the nitrogen gas introduced into the housing 8 becomes equal to or smaller than the predetermined value, the generation of the hydrogen gas and the oxygen gas in the hydrogen generation part 2 is stopped. As a result, based on the decrease in the flow rate of the nitrogen gas introduced into the housing 8 (or the decrease in the pressure of the nitrogen gas in the housing 8), it is possible to restrain the combustible gas such as the hydrogen gas generated in the hydrogen generation part 2 or the like from affecting the electric device 7 arranged inside the housing 8.

In the gas mixing device 1 according to the present embodiment, when the nitrogen gas (non-combustible gas) introduced into the housing 8 is the nitrogen gas supplied from the pressure container 51, even if there is no power such as electric power or the like, the nitrogen gas can be introduced into the housing 8 by the pressure of the nitrogen gas itself. Accordingly, even at the abnormality occurrence time such as a power failure time or the like, the electric device 7 arranged inside the housing 8 can be protected from the combustible gas such as the hydrogen gas or the like.

Although the embodiment of the present disclosure has been described in detail above, the present disclosure is not limited to the above-described embodiment. Various modifications may be made without departing from the spirit of the present disclosure.

The mixing gas supply device of the present disclosure is not limited to including the hydrogen generation part 2, but may include a combustible gas generation part that generates at least a combustible gas.

According to the present disclosure in some embodiments, it is possible to treat a hydrogen gas even when an abnormality occurs.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A hydrogen gas mixing device, comprising:
 a hydrogen generation part configured to generate a hydrogen gas;
 a mixing gas supply part configured to supply a mixing gas;
 a gas mixing part configured to mix the hydrogen gas and the mixing gas;
 a dilution gas supply part configured to supply a non-combustible dilution gas and including a pressure container configured to store the dilution gas in a compressed state; and
 a valve circuit configured to, at an abnormality occurrence time, dilute the hydrogen gas with the dilution gas by connecting a first path for the hydrogen gas supplied from the hydrogen generation part and a second path for the dilution gas supplied from the dilution gas supply part,
 wherein the second path is connected to the mixing gas supply part and the pressure container, and
 wherein a switching part, which is configured to switch between the mixing gas supplied from the mixing gas supply part and the dilution gas stored in the pressure container as the dilution gas for diluting the hydrogen gas, is provided in the second path.

2. The hydrogen gas mixing device of claim 1, wherein the abnormality occurrence time is a time when power failure occurs.

3. The hydrogen gas mixing device of claim 1, wherein the hydrogen gas diluted by the dilution gas is released to an atmosphere.

4. The hydrogen gas mixing device of claim 1, wherein the valve circuit includes a first normally-open electromagnetic valve configured to open and close the first path, and a second normally-open electromagnetic valve configured to open and close the second path.

5. The hydrogen gas mixing device of claim 1, wherein the mixing gas is used as the dilution gas, and
 wherein the dilution gas supply part includes the mixing gas supply part.

6. The hydrogen gas mixing device of claim 1, wherein the mixing gas includes at least a nitrogen gas, and wherein the mixing gas supply part includes a filter configured to separate the nitrogen gas from air and take out the separated nitrogen gas.

* * * * *